March 27, 1956 R. J. JAUCH ET AL 2,739,738
FLUID PROPORTIONING AND DISPENSING SYSTEM
Filed Sept. 24, 1951 2 Sheets-Sheet 1

INVENTORS
ROBERT J. JAUCH
BY CHRISTIAN W. KRUCKEBERG

*Arthur A. Smith*
ATTORNEY

March 27, 1956    R. J. JAUCH ET AL    2,739,738
FLUID PROPORTIONING AND DISPENSING SYSTEM
Filed Sept. 24, 1951    2 Sheets-Sheet 2
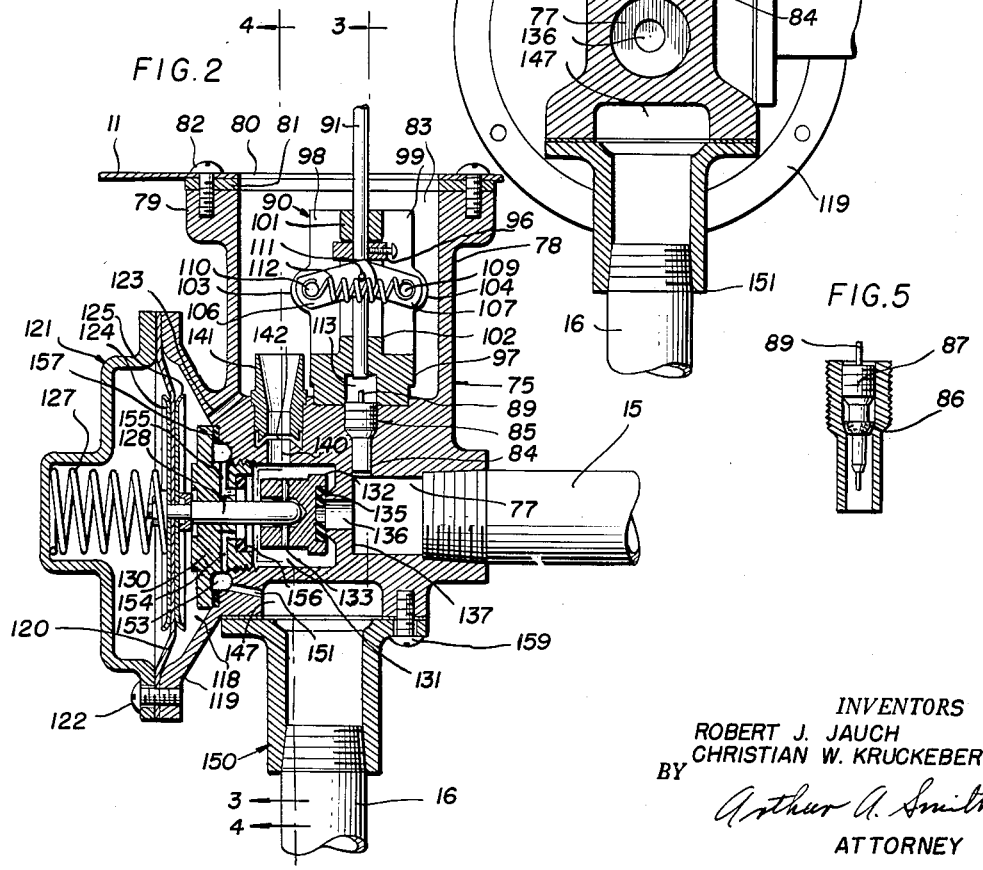
INVENTORS
ROBERT J. JAUCH
CHRISTIAN W. KRUCKEBERG
BY
Arthur A. Smith
ATTORNEY United States Patent Office 2,739,738
Patented Mar. 27, 1956

2,739,738

FLUID PROPORTIONING AND DISPENSING SYSTEM

Robert J. Jauch and Christian W. Kruckeberg, Fort Wayne, Ind.; said Kruckeberg assignor to said Jauch Application September 24, 1951, Serial No. 248,088

30 Claims. (Cl. 222—133)

This invention relates generally to devices adapted to mix a plurality of different materials in predetermined proportions, and, more particularly, it relates to devices adapted to mix a vehicle and a concentrate in predetermined proportions, the vehicle being a fluid and the concentrate being either a fluid or a solid material.

The apparatus embodied in this invention may be applied in a number of different arts. For example, in the art of poultry husbandry it is desirable to mix medicinal concentrates with drinking water for the purpose of administering medicinal preparations to poultry. This invention also may be applied in the art of compounding fluid insecticides for application to fruit trees, vegetable plants and the like. Another application of this invention is in the pharmaceutical art where it is desired to compound medicinal preparations.

This invention is especially adapted to the mixing of medicinal preparations for poultry. It may be assumed that there are two methods of administering medicine to poultry. One method is to mix medicine with poultry feed and the other is to mix medicine with drinking water. It is comparatively difficult efficiently to feed a medicinal preparation to poultry in the commercially prepared feed mixtures. This is because uniformity of mixture is substantially unattainable where it is desired to mix, for example, a pound of medicine in powder form in a ton of feed material. Without uniformity of mixture, a given bird may eat an overdose of medicine or too light a dose. This is an inefficient method of administering medicine to poultry also by reason of the fact that when a bird contracts a disease it stops eating and thereby fails to receive the medicine which it needs. On the other hand, a diseased bird usually contracts a feverish condition and consumes more than its normal amount of water. Then, too, it is comparatively simple to obtain a uniform mixture of medicine and water. Thus, water in many respects is the ideal vehicle for administering a medicinal preparation to diseased poultry. Water is also used widely as a vehicle for insecticides and various medicinal preparations for human consumption whereby this invention is also particularly adapted for use in these fields.

In all of these fields, it is essential that the mixture of a concentrate with a vehicle such as water be of accurate proportions. Various devices have been devised for mixing medicinal concentrates and a vehicle such as water, but none of these devices meets the accuracy requirements. For example, it is known to use cylinder and piston mechanisms operating by means of differential pressures for compounding medicinal concentrates with a vehicle. However, such devices inherently are inaccurate. For example, in supplying medicated water to poultry there is wide variation in rate of flow, as poultry consumes a considerable quantity of water during the early hours of the day, whereas at other times the rate of consumption may be extremely low. Accordingly, a differential pressure device may be operating during one period at a relatively fast rate whereby leakage between the piston and cylinder is of no great moment, but, when the rate of consumption is very low, the rate of leakage may be such that a dangerously excessive amount of medicinal concentrate is mixed in the vehicle. Another factor which causes inaccuracy of measurement and mixture is corrosion caused by the alkaline character of most poultry medicines. This causes leakage and affects the rate of motion of the piston. Still another factor which causes inaccuracy of measurement is variation of water pressure in farm water supply systems. For example, the pressure in such systems usually varies during a pumping cycle between a minimum of 20 pounds per square inch and a maximum of 40 pounds per square inch. This causes inaccuracy of measurement by reason of the fact that an imperfect piston seal permits a variation in leakage at the different water pressures.

Accordingly, the principal object in this invention is to provide a novel apparatus for mixing medicinal concentrates wth fluid vehicles and dispensing the resultant composition.

Another object of this invention is to provide apparatus for positively and accurately mixing a medicinal preparation with a fluid vehicle in a predetermined proportion.

Still another object of this invention is to provide apparatus for adding a medicinal preparation to a fluid vehicle which is adapted to measure an accurate quantity of a concentrate, seal off this quantity, inject it into the fluid vehicle and mix the concentrate with the fluid vehicle.

A further object of this invention is to provide apparatus adapted to mix a concentrate with a fluid vehicle in predetermined proportions with extreme accuracy and including provisions for variation of proportionate mixture.

A still further object of this invention is to provide apparatus adapted to mix a concentrate with water and which may be connected to any conventional water supply system.

Still another object of this invention is to provide apparatus for mixing a concentrate and a fluid vehicle, the inherent characteristics of which are such that a mechanical failure cannot result in the administering of an excessive dose of such concentrate.

A still further object of this invention is to provide, in combination with a metering valve or a measuring cup, a means for withdrawing a measured quantity of material and scavenging the interior of said valve or cup for removing substantially all of its contents.

A still further object of this invention is to provide a mixing apparatus, a measuring cup, and apparatus for scavenging the contents of said cup to remove them in their entirety and for creating turbulence within the mixed materials, thereby to improve the mixture thereof.

In accordance with this invention there is provided a fluid mixing device comprising a reservoir adapted to contain a medicinal concentrate; a tank adapted to contain a mixture of the concentrate and a fluid vehicle; a measuring mechanism connected to the reservoir for receiving concentrate; and a mixing valve operatively associated with the tank, the measuring mechanism, and the source of the fluid vehicle for cyclically filling the tank with a mixture of the concentrate and the vehicle.

In accordance with another feature of this invention there is provided a fluid mixing device comprising a source of one fluid, a tank adapted to contain a mixture of the one fluid in a fluid vehicle, a measuring mechanism consisting of a measuring cup connected with the source for receiving fluid therefrom, a vent pipe extending from the interior of the cup, a mixing mechanism including an injector connected with a source of fluid vehicle and the tank, a restricted port connecting the injector with the cup for withdrawing fluid from the cup during its initial period of operation and thereafter to draw air through the vent pipe and introduce it into said tank for agitating and mixing the contents thereof.

In accordance with still another feature of this invention there is provided a fluid measuring device including a casing formed to provide a chamber therein, a cup within the chamber formed to provide a drainage outlet in one part thereof, an air vent connected to the chamber over the cup, means for supporting the cup for movement with respect to the casing, an inlet port connected to said chamber and disposed outside of the periphery of the cup and means for normally holding the cup open with respect to said port and with said drainage outlet in sealed relationship to said casing, whereby movement of the cup is effective to unseal the drainage outlet and seal the cup with respect to said port.

Also in accordance with this invention there is provided a mixing valve for mixing fluids and comprising a body portion formed to provide an inlet chamber for receiving a first fluid, a discharge port, an inlet control valve in operative relation with the inlet chamber, an inlet valve actuating means adapted to cooperate with a fluid level responsive means in a tank for operation at maximum and minimum levels in said tank, and a mixing means connected between the valve and the tank and including a suction chamber and a port adapted to receive a second fluid for mixture with the inlet fluid.

Other and further objects of the present invention subsequently will become apparent by reference to the following description taken in conjunction with the accompanying drawings wherein:

Figure 1 is a front plan view of a medicinal concentrate mixing and dispensing device as provided by this invention.

Figure 2 of the drawings is a cross sectional view taken on line 2—2 of Figure 1 with parts omitted for clarity of illustration.

Figure 3 is a cross sectional view taken on line 3—3 of Figure 2 and also showing an actuating float.

Figure 5 is a detailed view, partially in cross section, of a pilot valve shown in Figures 2 and 3.

Figure 6 is a cross section taken on line 6—6 of Figure 4 with background parts omitted.

Figure 1:
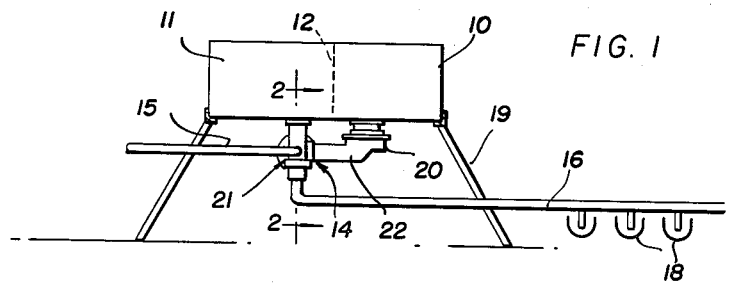

In accordance with a preferred embodiment of this invention, there is provided apparatus adapted to measure, mix and feed medicated water to poultry, which comprises a reservoir 10, adapted to contain a quantity of a medicinal concentrate, such, for example, as materials commercially known as "Megasul," "Sulfaquinoxiline," and "Enheptin," and a tank 11 adapted to be filled with a fluid vehicle, such, for example, as water. The reservoir and tank may be structurally separate from one another or they may consist of the unitary structure divided by a partition 12, as shown in Figure 1. For simultaneously filling tank 11 and mixing a predetermined dose of the medicinal concentrate with water there is provided a control mechanism 14 connected to the tanks 10 and 11. Mechanism 14 includes a water inlet 15 which is adapted to be connected to a pressure water system (not shown) and also includes an outlet 16 which is adapted to be connected to a water system of the type customarily used for dispensing water to poultry. Such systems usually include a plurality of automatically filled fountains 18.

Reservoir 10 and tank 11 may be supported on a table 19 located either in a poultry house or on a range which consists of an open field or other open space conventionally used for raising poultry. It should be understood that while the invention is described in connection with its application to poultry husbandry, the invention is equally applicable to the preparation or mixture of insecticides, pharmaceutical preparations, or other fluids where it is desired to mix a concentrate, either fluid or solid, with a fluid vehicle. In such cases it might be desirable to use larger tanks and to support them in different rooms or on different floors of a building.

The control mechanism 14 comprises a metering valve 20 and mixing valve 21, the two valves being connected together by a connector 22. Connector 22 may be an integral part of valve 20 or valve 21, or may consist of pipes or tubes. Metering valve 20 operates cyclically to measure a predetermined quantity of concentrate from reservoir 10 and subsequently to spill the measured quantity. Mixing valve 21 functions cyclically to control valve 20 and draw off the measured quantity of concentrate as valve 20 spills it, to mix the concentrate with a predetermined quantity of water, to feed the mixture into tank 11, and subsequently to drain the mixture from tank 11 into the distribution system connected to outlet 16. The filling of valve 20 occurs during the initial period of drainage from tank 11 whereby it is always full when valve 21 operates to initiate a cycle.

Metering valve 20 consists of a generally cylindrical body portion 24 having an annular flange 25 to which may be attached a cover 26. Cover 26 includes annular flange 27 for mounting on flange 25, the joint being sealed by rubber diaphragm 28. Machine screws, such as 30, may be used for holding cover 26 on body 24. Cover 26 also includes as an integral part thereof a flange 32 which may be fastened to the bottom of reservoir 10 by means of machine screws 33, a gasket 34 being provided as a seal between flange 32 and reservoir 10. Flange 32 registers with a hole 35 in reservoir 10 so that concentrate may flow into a chamber or sump 36. Strainer 37 may be mounted in chamber 36 by being threaded into a bore 38 in cover 26 thereby providing a connecting inlet for concentrate from reservoir 10 into the chamber 39 formed by the diaphragm 28 and cover 26. Strainer 37 may be of any conventional construction to provide passage of fluid through a straining screen.

Within body 24 there is a measuring mechanism comprising a cup 41 having a predetermined capacity which may be of the order of 50 cubic centimeters, or of any other desired capacity depending upon the proportions of the desired mixture and the materials being mixed. Cup 41 may be supported by means of the rubber diaphragm 28 designed to provide an upward and downward movement of cup 41 as will be described subsequently. Diaphragm 28 may be fixed to cup 41 by means of machine screws 42 threaded in suitable bores within cup 41 as shown. In order to minimize possibility of fracture of diaphragm 28 there may be provided a ring member 43 overlying the diaphragm. This is in accordance with well known practice.

For connecting the metering valve 20 with mixing valve 21, there is provided the connector 22 having a flat, annular portion 45 for receiving a second diaphragm 46 together with the lower perimeter of valve body 24. Body portion 24 and portion 45 may be fixed to one another by means of screws 48. Diaphragm 46 is also fixed to the bottom of cup 41 by means of screws 49, with ring 50 overlying the diaphragm to prevent fracture thereof.

Diaphragms 28 and 46 permit cup 41 to move either upwardly or downwardly. During a cycle of operation, cup 41 moves upwardly and must be sealed from chamber 39, and therefore it includes a rim 51 movable into engagement with the sealing ring 52 embedded in an annular groove within cover 26 as illustrated in the drawings. The bottom of cup 41 is provided with a drainage outlet 54 which terminates in a rim 55 movable into engagement with a sealing ring 56 which may be embedded within a recess in the connector 22 as illustrated in the drawings. It should be noted that ring 56 is situated in a chamber 57 which is sealed by diaphragm 46.

For normally holding cup 41 in its downward position there is provided a spring 58, the lower end of which rests on a shoulder 60 formed by providing a counterbore 61 coaxial with outlet 54 but of larger diameter. At its upper end spring 58 engages cover 26 as shown.

For providing a flow of air through chamber 39 and cup 41 there is provided a vent or breather pipe 63 fitted at its lower end into a bore within a boss 64 on cover 26. Tube 63 is of sufficient length to extend above the normal level of concentrate within reservoir 10 whereby air may flow into the chamber 39 or cup 41, as will be described subsequently.

For providing operating pressure for cup 41 there is provided a bore 66 in the bottom of the body 24, this bore communicating with a coaxial bore 67 and a longitudinal bore 68 in connector 22, the purpose of which will be described subsequently in more detail. Connector 22 is also provided with a third bore 69 which communicates with the chamber beneath diaphragm 46 and applies suction for emptying cup 41 as will also be described subsequently. Connector 22 may be provided with a flange 71 which may be fixed to the valve 21 by means of machine screws 72.

Mixing valve 21 (Figure 2) consists of a body portion 75 the upper portion consisting of a neck 78 having a flange 79 at its upper perimeter for attachment to tank 11 in register with hole 80 in the bottom thereof. The washer 81 seals the joint between flange 79 and tank 11 with screws 82 extending from tank 11 into the flange for securing the valve 21 in its operative position. Neck 78 is generally rectangular and forms a chamber 83 of the same general shape. At the bottom of chamber 83 there is provided a bore 84 connecting to bore 77 which is threaded to receive the inlet water pipe 15. Within bore 84 there is provided a pilot valve 85 for controlling the cycling of the mixing valve and consisting of a valve seat 86 (Figure 5), threaded into the bore 84, and the valve stem 87, threaded within seat 86. Stem 87 may be of the same construction as the conventional tire valve stem and includes a push rod 89 which is adapted to be depressed for opening the valve.

Over the bore 84 and valve 85 there is provided a toggle stand 90 (Figures 2, 3) for movably supporting a float rod 91 which extends upwardly into tank 11 as illustrated. The toggle stand may be fixed in any desired manner to body 75 in sealed relation thereto. For moving rod 91 when the liquid level in tank 11 reaches its maximum and minimum limits there is provided a float 92 slidably mounted on rod 91. Float 92 moves rod 91 downwardly when it engages a stop 94, adjustably mounted on rod 91, and upwardly when it engages a stop 95, adjustably mounted on the upper portion of rod 91. Another stop 96 (Figure 3) is mounted on rod 91 to limit the upward motion of rod 91 as will be described subsequently. Toggle stand 90 includes a base 97 and, integrally formed therewith, a pair of spaced posts 98 and 99 which extend upwardly and are joined at the top by a boss 101. The base 97 includes another boss 102. Bosses 101 and 102 are bored centrally thereof slidably to receive rod 91 and to serve as guides for the same. Rod 91 may be fitted within boss 102 to be slidable without permitting material flow of fluid for reasons which will be apparent from the following description.

For biasing and holding rod 91 in its upper and lower operative positions there is provided a toggle mechanism which is pivoted in ears 103 and 104 of posts 98 and 99 respectively. The toggle mechanism comprises toggle bars such as 106 and 107 pivoted at their outer ends on pins 109 and 110 as illustrated. The inner ends of bars 106 and 107 are pivoted together and to rod 91 by means of a pivot pin 111. The toggle mechanism may include a single pair of bars 106 and 107 or two pairs of such bars arranged on opposite sides of posts 98 and 99. Ears 103 and 104 are provided with bores which may be elongated horizontally whereby when rod 91 is depressed, the outer ends of bars 106 and 107 may move outwardly. To impart a toggle motion to the mechanism there is provided a spring 112 fastened to pins 109 and 110 as illustrated. If two pairs of toggle bars are provided, then a second spring may be mounted on the pins as shown in Figure 3. Thus, when rod 91 is moved downwardly or upwardly to move pivot pin 111 past the axis of spring 112 there is a toggle effect which holds rod 91 in either one of its extreme positions. Rod 91 is aligned with rod 89 of valve 85 for operating it as will be described subsequently.

Base 97 of toggle stand 90 is formed to provide a sealed chamber 113 into which rods 89 and 91 project. Chamber 113 includes an extension 114 (Figure 3) which registers with an angular bore 115 which in turn connects with a longitudinal bore 116, terminating in a chamber 118, formed by a frusto-conical extension 119 of the body 75 together with a diaphragm 120. The diaphragm seals the end of extension 119 and is clamped in position by means of a spider 121 held in position by machine screws 122. Thus, valve 85, chambers 113 and 114, and bores 115 and 116 provide a water connection between bore 77 and the chamber 118 thereby to create movement of diaphragm 120. Diaphragm 120 may be provided with a pair of light metallic plates 124 and 125 for holding it in a normally flat condition and preventing rupture thereof. For permitting diaphragm 120 to move to the right after water pressure is applied thereto, there is provided a bleeder bore 123 leading into chamber 83 from chamber 118. For normally holding diaphragm 120 in the position illustrated in the drawings there is provided a spring 127 compressed between the outer extremity of spider 121 and the central portion of diaphragm 120.

Diaphragm 120 is provided with a valve stem 128, the left-hand end of which may be threaded to receive a nut for fixing the stem to the central portion of the diaphragm 120. Stem 128 is supported in a cap 130, which is threaded into the walls of the chamber 131 as illustrated. Valve stem 128 is pinned at its right-hand end to a two-way poppet valve 132 by means of a pin 133. Valve 132 includes a sealing washer 135 which is adapted to engage the lip of a bore 136 in partition 137 which forms the end of inlet bore 77. Thus, when valve 132 opens, it serves as an inlet valve whereby inlet water or other fluid vehicle may flow into the chamber 131. Valve 132 is held normally closed by spring 127 which is designed to exert a force greater than the maximum force exerted on the valve by inlet water pressure. However, valve 132 is opened when pilot valve 85 opens to impress water pressure on the inner side of diaphragm 120 through bores 115 and 116. Under these conditions the sum of the force on the face of valve 132 and the force on the inner face of diaphragm 120 exceeds the force exerted by spring 127 whereby valve 132 opens. Cap 130 and poppet 132 co-operate to serve as an outlet valve as will be explained subsequently.

Adjacent the upper part of the chamber 131 there is provided an injector comprising a bore 140 which communicates with the interior of a venturi tube 141. It should be noted that body 75 and the lower end of venturi 141 are formed to provide a cylindrical chamber 142 between the upper extremity of bore 140 and the lower surface of tube 141. This chamber is connected with the bore 69 in connector 22 by means of a short restricted bore 143 and a larger bore 144 whereby water flowing through the venturi causes suction to draw fluid from the chamber 57 at the inlet of tube 69. Bore 143 is restricted for the purpose of regulating the rate of flow of concentrate from cup 41 as will be explained subsequently.

In the lower part of body 75 there is provided an outlet chamber 147. A cylindrical outlet fitting 150 may be fixed to body 75 co-axially with chamber 147 by machine screws, such as screw 159, thereby to serve as a connection with the drainpipe 16. Outlet chamber 147 may be connected to chamber 131 by means of a port 151 which opens into an annular chamber 153 formed in body 75 co-axially with chamber 131 as illustrated in Figure 2. In turn, chamber 153 opens into a plurality of ports, such as 154 and 155, bored in the cap 130 and opening into chamber 131. A number of ports such as 154 and 155 may be provided to obtain the desired rate of flow. For providing sealing contact between cap 130 and valve 132 a gasket 156 may be mounted within the right-hand end of cap 130. Also, a gasket 157 may be mounted between the left-hand end of cap 130 and body 75 for sealing chamber 153. Thus, when valve 132 is in the position shown in the drawing, fluid may flow out of chamber 131, through ports 154 and 155, into chamber 153 and from there through port 151 into chamber 147 and through the outlet fitting 150.

Figure 4:
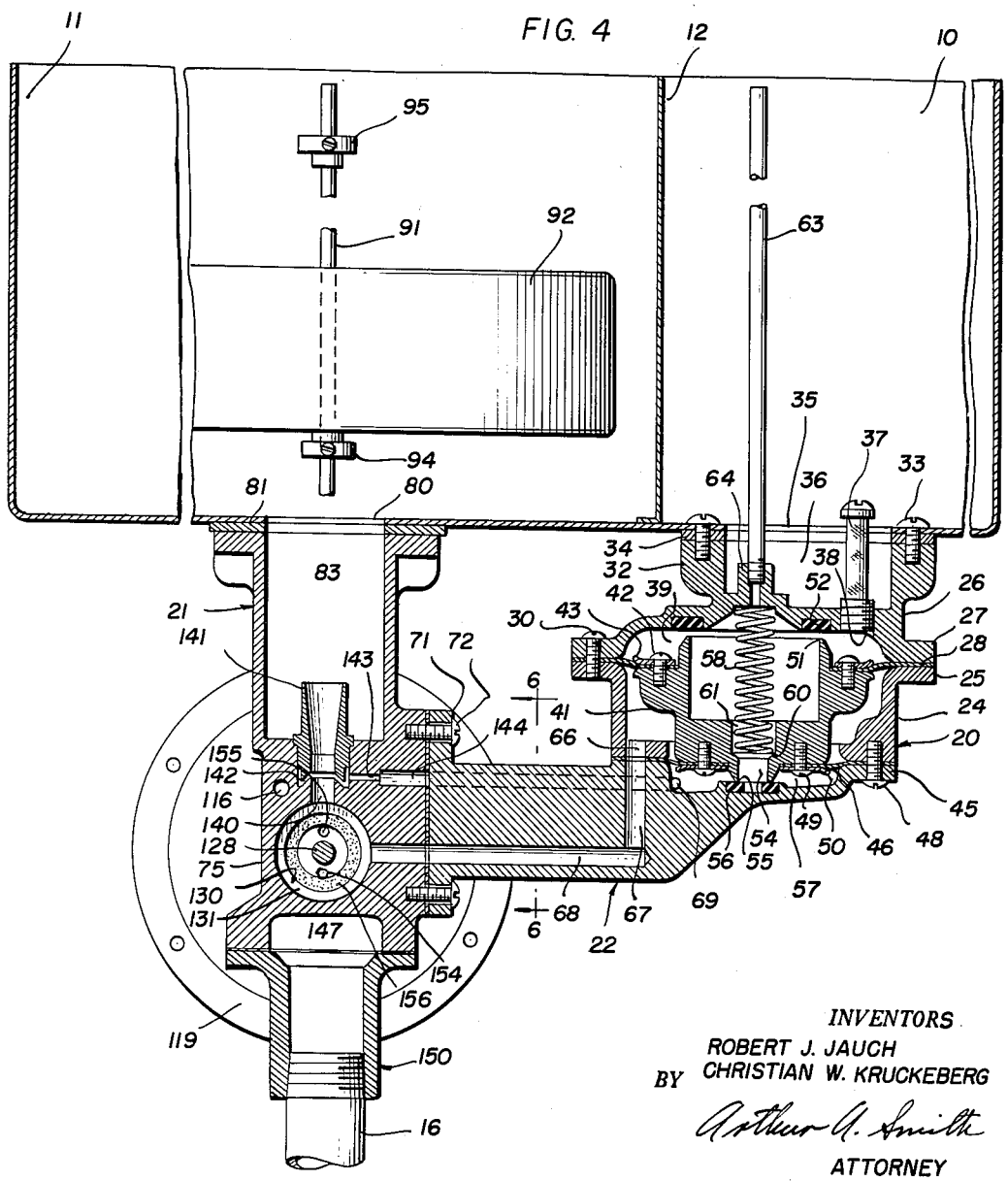
Figure 4 is a cross sectional view taken on line 4—4 of Figure 2 with certain parts added.

For describing the operation it will be assumed that reservoir 10 is filled with a medicinal concentrate whereby the chamber 39 and cup 41 will be full of such concentrate. Tube 63 will also be filled with concentrate to the level of the concentrate in reservoir 10. It will also be assumed that the cup 41 is in the position illustrated in Figure 4 of the drawings, and that float 92 is in the position illustrated in Figure 3 of the drawings where it is about to come to rest on stop 94. Also, it is assumed that the valve 132 is in its closed position with respect to bore 136 and that conversely the ports 154, 155 are open whereby fluid is draining from tank 11 through the venturi 141, chamber 131, ports 154, 155, chamber 153, port 151 and fitting 150 into outlet pipe 16.

Stop 94 being set on float rod 91 at the minimum liquid level of tank 11, float 92 will come to rest on stop 94 when the level of the liquid reaches its minimum. The weight of float 92 is sufficient to overcome the tension of spring 112 of the toggle joint whereby rod 91 moves downwardly into engagement with the rod 89 of pilot valve 85 thereby to open this valve. Water then passes through valve 85 into chambers 113 and 114, through bores 115 and 116, into chamber 118. Whereas the force exerted on valve 132 by the water in inlet 15 was insufficient to overcome the force of spring 127 due to the limited area of the valve, the added force created by the additional water pressure within chamber 118 creates sufficient force on the right-hand side of diaphragm 120 to overcome the force of spring 127 whereby diaphragm 120 moves to the left, moving valve 132 to the left into contact with gasket 156. This opens bore 136 and closes ports 154 and 155. Water then passes from inlet 15 into chamber 131. Ports 154 and 155 being closed, water ceases to flow to the outlet pipe 16. Water flow is reversed through the bore 140 and the venturi tube 141 thereby to commence the filling of tank 11 and to create suction in the chamber 142 and the bores 143, 144 and 69.

Simultaneously, water passes from chamber 131 through bores 68, 67 and 66 into the chamber between diaphragms 28 and 46. Diaphragms 28 being larger than diaphragm 46 the resultant force is sufficient to elevate cup 41 in a small fraction of a second into its uppermost position, with the rim 51 of the cup in engagement with the sealing ring 52. It is important that cup 41 move upwardly substantially instantaneously when suction occurs in order to prevent flow of concentrate over the rim of cup 41 from chamber 39. Substantially instantaneous movement of cup 41 is accomplished by providing a very small spacing between rim 51 and ring 52 when the cup 41 is in its downward position. This spacing may be of the order of ⅛ inch, which is sufficient to allow cup 41 to fill during the time period required for tank 11 to be drained so that cup 41 is always ready to discharge a dose of concentrate when tank 11 has been emptied. Rapid or instantaneous engagement of rim 51 with ring 52 is also provided by designing the bores 68, 67 and 66 to have a cross-sectional area sufficient to provide substantially instantaneous pressure within the space between the diaphragm 28 and 46 whereby there is a sort of snap elevating action to move cup 41 upwardly. This prevents the initial suction of injector 141 from drawing concentrate from chamber 39 into cup 41 and consequent inaccurate measurement of the dose of concentrate. Since accuracy is important, the structure and action of cup 41 is designed to insure that only the concentrate within cup 41, that within the space directly above the cup and the column of concentrate in tube 63 will be injected into the fluid vehicle flowing into the tank 11.

Simultaneously with the elevation of cup 41, the lip 55 at the lower side of cup 41 moves out of sealing engagement with gasket 56 whereby the contents of cup 41 have ingress to the chamber beneath diaphragm 46.

As already explained, there is suction in bore 143. The rate at which fluid is withdrawn from cup 41 is determined by the size of bore 143, and this size is calculated to create sufficient suction to withdraw 50 cc. of concentrate from cup 41 within a period of, for example, one second. The size of bore 143 is also calculated to create sufficient suction to draw a blast of air through vent 63 and scavenge the interior of cup 41 thereby to remove substantially all of the concentrate contained therein. This is necessary in order to obtain accurate dosage of concentrate because of the fact that if any appreciable quantity of the concentrate were left in cup 41, the dose injected into the fluid vehicle would not be that which was required in the desired mixture. Of course, the liquid above the lip of cup 41 and that in tube 63 is sucked into the stream which passes through venturi 141. During this stage there is a certain degree of mixture of the medicinal concentrate with the water in venturi 141, but as soon as the cup 41 and tube 63 have been emptied, air is sucked into the water stream and creates turbulence in tank 11 as the flow of the water and concentrate mixture flows upwardly into contact with the bottom of float 92. When the air and fluid mixture is deflected by float 92 there is appreciable turbulence which enhances the mixing action whereby the mixture becomes more and more complete or uniform as tank 11 fills.

Stop 95 being set to the maximum water level within tank 11, float 92 eventually rises into contact with this stop and lifts the rod 91 out of contact with the shaft 89 of valve 85 thereby allowing this valve to close. As soon as the valve is closed, the passage 123 permits the pressure within the chamber 118 to decrease to such a degree that spring 127 moves diaphragm 120 to the right and therewith valve 132 into sealing engagement with the lip of bore 136 whereby the inflow of water from pipe 15 is terminated.

At this point the valve 132 opens ports 154 and 155 in cap 130 whereby the mixture in tank 11 is permitted to drain by gravity through venturi 141, chamber 131, ports 154, 155, chamber 153, port 151, and through the fitting 150 into the outlet pipe 16.

The drainage of tank 11 is determined by the demand created by the chickens' rate of consumption from the fountains 18. As each fountain becomes drained and its automatic valve opens, water drains from tank 11. This continues until such time as float 92 again moves rod 91 downwardly to initiate another mixing cycle.

It is to be noted that cup 41 has a relatively fixed capacity and therefore in order to vary the amount of fluid vehicle which may be mixed with the contents of cup 41, there is provided the stop 95 on rod 91 whereby the amount of vehicle which may be admitted to tank 11 is controlled thereby to provide variation of proportion of vehicle to medicinal concentrate.

Another method of varying the dosage is to dilute the concentrate which is poured into reservoir 10. By such dilution the proportion of concentrate to vehicle may be decreased, whereas, as explained above, the same proportion may be increased by reducing the quantity of vehicle admitted to tank 11 with respect to the fixed amount of medicinal concentrate in the cup 41.

Still another method of decreasing the proportion of concentrate to vehicle is to insert a desired number of washers in cup 41 thereby to decrease its capacity.

When valve 132 closes bore 136, the flow of water upwardly through venturi 141 is terminated and thus there is no longer suction within the passages 66, 67 and 68, and the pressure within chamber 131 decreases to that created by the head of water in tank 11. Thus, the pressure within passages 66, 67 and 68 is substantially decreased and, in fact, is decreased to the point where spring 58 moves cup 41 downwardly until lip 55 engages the sealing ring 56. Since cup 41 is empty and is open to the atmosphere through tube 63, medicinal concentrate immediately flows through the filter 37 into chamber 39 and into cup 41, filling cup 41 and tube 63 up to the level of concentrate in reservoir 10. It should be noted that this action of filling cup 41 occurs during the initial period of drainage of tank 11. As mentioned heretofore, the spacing between lip 51 of cup 41 from ring 52 is sufficient to allow cup 41 to fill during the initial emptying of tank 11. This insures that cup 41 will be full of a dose of concentrate when tank 11 becomes emptied and the mixing cycle is initiated for a second time.

From the foregoing description it is apparent that cup 41 "spills" concentrate and the injector 141 simultaneously mixes the concentrate with the vehicle flowing into tank 11. At the completion of this "spill and mix" cycle, a "fill and drain" cycle is initiated whereby cup 41 fills with concentrate simultaneously with the drainage of tank 11.

While this invention has been disclosed to include a diaphragm operated mixing valve and a diaphragm operated measuring cup, it is recognized that another modification of the invention might be devised by utilizing a solenoid operated mixing valve and a solenoid operated measuring cup, the solenoids being energized by means of a float operated switch in the tank 11.

Still another modification of this invention might be devised to permit continuous flow of mixture from the mixing valve during the filling of tank 11. This would require merely that valve 132 should never close ports 154, 155.

While the invention has been disclosed as being utilized for the proportioning and mixing of a fluid concentrate with a fluid vehicle, it is entirely possible to use this invention for mixing powdered medicines, insecticides or other materials in a fluid vehicle. In this modification of the invention it would require merely that the inlet to the cup 41 be enlarged to permit free flow of the powdered material. The contents of cup 41 could then be removed by means of the suction created in the passages 69, 143, and 144 as in the case of a liquid concentrate.

The invention has been disclosed in a preferred embodiment as applied to a poultry watering system, but it is to be understood that the invention is equally applicable for the purpose of preparing insecticide solutions, other types of medicinal solutions, or any other preparations where it is desired to mix a concentrate, either fluid or solid, with a fluid vehicle.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

We claim:

1. A fluid dispensing system comprising a measuring mechanism including a measuring chamber, a reservoir connected to communicate with said chamber, a mixing mechanism connected to said measuring mechanism, and adapted to be connected to a source of fluid vehicle, and cyclic control means for emptying said chamber into said mixing mechanism to mix the contents of said chamber with said vehicle during one part of a cycle and to fill said chamber from said reservoir during another part of the cycle.

2. A fluid dispensing system comprising a reservoir for containing a quantity of medicinal concentrate, a tank adapted to contain a mixture of said concentrate and a fluid vehicle, a measuring mechanism comprising a measuring chamber connected to said reservoir, a mixing mechanism connected between said measuring mechanism and said tank and adapted to be connected to a source of fluid vehicle, and control means operatively associated with said chamber and said mixing mechanism for simultaneously draining said tank and filling said chamber from said reservoir when and after the fluid in said tank reaches a predetermined maximum level, and for simultaneously emptying said chamber into said mixing mechanism and mixing the contents of said chamber with a fluid vehicle when and after the liquid in said tank reaches a predetermined minimum level to fill said tank with the mixture created in said mixing mechanism.

3. A fluid mixing device comprising a reservoir for containing a quantity of medicinal concentrate; a tank adapted to contain a mixture of said concentrate and a fluid vehicle; a measuring mechanism comprising a chamber connected to said reservoir for receiving concentrate; and a mixing valve connecting said tank, said chamber and a source of fluid vehicle and including mechanism responsive to the maximum and minimum fluid levels in said tank for cyclically emptying the contents of said chamber into said value and filling said tank with a mixture of said contents and vehicle.

4. A fluid mixing device comprising a reservoir for containing a quantity of medicinal concentrate; a tank adapted to contain a mixture of said concentrate and a fluid vehicle; a measuring mechanism comprising a chamber connected to said reservoir and movably mounted for cyclically receiving concentrate from said reservoir; a mixing valve connected to said tank and to a source of said vehicle comprising a flow-control mechanism and an injector connected with one another and said chamber and responsive to minimum fluid level in said tank for cyclically withdrawing said medicinal concentrate from said chamber and mixing it with said vehicle, and filling said tank with the mixture.

5. A fluid mixing device comprising a reservoir for containing a quantity of medicinal concentrate; a tank adapted to contain a mixture of said concentrate and a fluid vehicle; a measuring mechanism comprising a chamber connected to said reservoir for receiving concentrate; a mixing valve connected to said tank and comprising a flow-control valve connected to a source of said vehicle, a float-controlled pilot valve operatively associated with said tank and said flow-control valve for actuating said flow-control valve, and an injector between said flow-control valve and said tank; and means operating with said injector and said flow-control valve for draining said chamber and mixing said concentrate with said vehicle.

6. A fluid mixing device comprising a reservoir for containing a quantity of medicinal concentrate; a tank adapted to contain a mixture of said concentrate and a fluid vehicle; a measuring mechanism comprising a measuring cup having a drainage outlet, and pressure responsive means connected to said cup movably to support said cup; an inlet flow-control valve connected to said tank and to a source of said vehicle, inlet pressure responsive valve actuating means operably connected to said valve for operating said valve, tank level responsive means connected to said valve actuating means and operatively associated with said tank for initiating operation of said flow-control valve, and an injector connected to said tank; and a connector comprising ports connecting said injector with said cup, and said flow-control valve with said pressure responsive means for moving said cup into drainage position and withdrawing said medicinal concentrate from said cup.

7. A fluid mixing device comprising a reservoir for containing a quantity of medicinal concentrate; a tank adapted to contain a mixture of said concentrate and a fluid vehicle; a measuring mechanism comprising a casing connected to said reservoir for receiving concentrate, and a measuring cup within said casing and including a drainage outlet, and pressure responsive means connected to said cup and said casing movably to support said cup with said outlet in sealed relation to said casing; a mixing valve connected to said tank, comprising a casing formed to provide an inlet valve chamber, a flow-control valve in said valve chamber, pressure responsive valve actuating means mounted on said valve casing and operably connected to said valve for holding said valve closed, a pilot valve connected to said valve actuating means and operatively associated with said tank for initiating operation of said flow-control valve, and an injector between said valve chamber and said tank; and a connector comprising ports connecting said injector with said cup, and said valve chamber with said pressure responsive means for moving said cup into drainage position and withdrawing said medicinal concentrate from said cup.

8. A fluid mixing device comprising a reservoir for containing a quantity of medicinal concentrate; a tank adapted to contain a mixture of said concentrate and a fluid vehicle; a measuring mechanism comprising a casing connected to said reservoir for receiving concentrate, a measuring cup within said casing and including a drainage outlet, and spaced diaphragms connected to said cup and said casing to define a sealed filling chamber, a sealed operating chamber and a sealed drainage chamber, and movably to support said cup with said outlet in sealed relation to said drainage chamber; a mixing valve connected to said tank, comprising a casing formed to provide an inlet valve chamber, a flow-control valve in said valve chamber and closing one end thereof, an actuating diaphragm mounted on said valve casing and operably connected to said valve and sealed to said casing to form a control pressure chamber for holding said valve closed, a pilot valve connected to said control pressure chamber and operatively associated with said tank to admit fluid to said control pressure chamber for actuating said diaphragm to open said flow-control valve, and an injector between said valve chamber and said tank; and a connector comprising ports connecting said injector with said drainage chamber, and said valve chamber with said operating chamber for moving said cup into drainage position and withdrawing said medicinal concentrate from said cup.

9. A fluid mixing device comprising a reservoir for containing a quantity of medicinal concentrate; a tank adapted to contain a mixture of said concentrate and a fluid vehicle; a measuring mechanism comprising a casing connected to said reservoir for receiving concentrate, a cup within said casing and formed to provide a measuring chamber and a drainage outlet in the bottom thereof, and spaced diaphragms connected to said cup and said casing to define a sealed filling chamber, a sealed operating chamber and a sealed drainage chamber, and movably to support said cup with said outlet in sealed relation to said drainage chamber; a mixing valve connected to said tank, comprising a casing formed to provide an inlet chamber and an adjacent valve chamber, a flow-control valve in said valve chamber and closing one end of said inlet chamber, a spring-biased actuating diaphragm mounted on said valve casing and operably connected to said valve and sealed to said casing to form a control pressure chamber for holding said valve closed against the fluid pressure in said inlet chamber, a pilot valve connected between said inlet chamber and said control pressure chamber, a float-controlled mechanism operatively associated with said tank and said pilot valve for opening said pilot valve to admit fluid to said control pressure chamber for actuating said diaphragm to open said flow-control valve, and an ejector between said valve chamber and said tank; and a connector comprising ports connecting said injector with said drainage chamber and said valve chamber with said operating chamber for moving said cup into drainage position and withdrawing said medicinal concentrate from said cup.

10. A fluid mixing device comprising a reservoir for containing a quantity of medicinal concentrate; a tank adapted to contain a mixture of said concentrate and a fluid vehicle; a measuring mechanism comprising a measuring chamber connected with said reservoir for receiving concentrate; a mixing mechanism connected with said tank and said chamber for withdrawing said concentrate from said chamber and mixing it with said vehicle, means connected to said mixing mechanism and a source of said vehicle for feeding said vehicle to said mixing mechanism, means responsive to said feeding means for filling and draining said chamber, and actuating means operably associated with said tank for cyclically actuating said mixing mechanism and each of said means when the liquid in said tank reached predetermined maximum and minimum levels.

11. A fluid mixing device comprising a reservoir for containing a quantity of medicinal concentrate; a tank adapted to contain a mixture of said concentrate and a fluid vehicle; a measuring mechanism comprising a measuring cup having a normally closed drainage outlet, and an inlet from said reservoir for filling said cup; a mixing mechanism comprising means connected with said tank and said cup for withdrawing said concentrate from said cup and mixing it with said vehicle, means connected to said withdrawing means and a source of said vehicle for feeding said vehicle to said withdrawing means and to said cup supporting means for moving said cup into filling or draining position, actuating means operably associated with said tank for cyclically actuating said withdrawing means when the liquid in said tank reaches predetermined maximum and minimum levels, and means responsive to said actuating means for draining said tank.

12. A fluid mixing device comprising a reservoir for containing a quantity of medicinal concentrate; a tank adapted to contain a mixture of said concentrate and a fluid vehicle; a measuring mechanism comprising a measuring cup having a normally closed drainage outlet and an inlet from said reservoir for filling said cup, and means connected to said cup movably to support said cup in a filling or a draining position; a mixing mechanism comprising means connected with said tank and said cup for withdrawing said concentrate from said cup and mixing it with said vehicle, means connected to said withdrawing means and a source of said vehicle for feeding said vehicle to said withdrawing means and to said cup supporting means for moving said cup into filling and draining position, a float controlled actuating means operably associated with said tank for cyclically actuating said withdrawing means when the liquid in said tank reaches predetermined maximum and minimum levels, and a normally closed drainage control valve operably associated with said tank and said actuating means and responsive to said actuating means to move into open position for draining said tank.

13. A fluid mixing device comprising a reservoir for containing a quantity of medicinal concentrate; a tank adapted to contain a mixture of said concentrate and a fluid vehicle; a measuring mechanism comprising a measuring cup having a normally closed drainage outlet and an inlet from said reservoir for filling said cup, and means connected to said cup movably to support said cup in a filling or a draining position; a mixing valve comprising an injector connected with said tank and said cup for withdrawing said concentrate from said cup and mixing it with said vehicle, a flow control valve connected to said injector and a source of said vehicle for feeding said vehicle to said injector and operating said cup supporting means for moving said cup into filling or draining position, a float controlled actuating means operably associated with said tank and said flow control valve for cyclically actuating said flow control valve when the liquid in said tank reaches predetermined maximum and minimum levels, and a normally closed drainage control valve operably associated with said tank and said actuating means and responsive to said actuating means to move into open position for draining said tank.

14. A fluid mixing device comprising a source of one fluid, a tank adapted to contain a mixture of said one fluid in a fluid vehicle; a measuring mechanism comprising a measuring chamber connected with said source for receiving fluid, a vent pipe connected with the interior of said chamber; and a mixing mechanism comprising an injector connected with a source of fluid vehicle and said tank, means defining a passage including a restricted port connecting said injector with said chamber, said mixing mechanism including means responsive to minimum level of fluid in said tank whereby said injector and said port cooperate to withdraw fluid from said chamber during its initial period of operation, and thereafter to withdraw air through said vent pipe and introduce it into said tank for agitating and mixing the contents thereof.

15. A fluid mixing device comprising a reservoir for containing a quantity of medicinal concentrate, a tank adapted to contain a mixture of said concentrate and a fluid vehicle; a measuring mechanism comprising a measuring chamber connected with said reservoir for receiving concentrate, a vent pipe connected with the interior of said chamber beyond the level of liquid in said reservoir; a mixing mechanism responsive to minimum fluid level in said tank and comprising an injector connected with said tank, means defining a passage including a restricted port connecting said injector with said chamber, said injector and said port cooperating to withdraw concentrate from said chamber during its initial period of operation, and thereafter to withdraw air through said vent pipe and introduce it into said tank for agitating and mixing the contents thereof, and means connected to said mixing mechanism and a source of said vehicle for feeding said vehicle into said mixing mechanism.

16. A fluid mixing device comprising a reservoir for containing a quantity of medicinal concentrate, a tank adapted to contain a mixture of said concentrate and a fluid vehicle; a measuring mechanism comprising a measuring chamber connected with said reservoir for receiving concentrate, a vent pipe connected with the interior of said cup and extending into said reservoir beyond the level of liquid in said tank; a mixing mechanism responsive to minimum fluid level in said tank and comprising an injector connected with said tank, means defining a passage including a restricted port connecting said injector with said chamber, said injector and said port cooperating to withdraw concentrate from said chamber during its initial period of operation, and thereafter to withdraw air through said vent pipe and introduce it into said tank for agitating and mixing the contents thereof; and cyclically operable means operatively associated with said tank and connected to said mixing mechanism and a source of said vehicle for feeding said vehicle into said mixing mechanism when the liquid in said tank reaches a predetermined minimum level.

17. A fluid mixing device comprising a source of one fluid, a tank adapted to contain a mixture of said one fluid and a fluid vehicle; a measuring mechanism comprising a measuring chamber connected with said source for receiving concentrate, a vent pipe connected with the interior of said chamber; a mixing mechanism responsive to minimum fluid level in said tank and comprising an injector connected with a source of vehicle and said tank, means defining a passage including a restricted port connecting said injector with said chamber, said injector and said port cooperating to withdraw concentrate from said chamber during its initial period of operation, and thereafter to withdraw air through said vent pipe and introduce it into said tank for agitating and mixing the contents thereof; and cyclically operable means operatively associated with said tank and connected to said mixing mechanism for feeding said vehicle into said mixing mechanism when the liquid in said tank reaches a predetermined minimum level.

18. A fluid measuring device comprising a casing formed to provide a chamber therein, a cup within said chamber formed to provide a drainage outlet in one part thereof, an air vent connected to said chamber over said cup, means for supporting said cup for movement with respect to said casing, an inlet port connected to said chamber and disposed outside of the periphery of said cup, and means for normally holding said cup open with respect to said port and with said drainage outlet in sealed relationship to said casing, whereby movement of said cup is effective to unseal said drainage outlet and seal said cup with respect to said port.

19. A fluid measuring device comprising a casing formed to provide a chamber therein, a cup within said chamber formed to provide a drainage outlet in the bottom thereof, an air vent connected to said chamber over said cup, pressure responsive means mounted within said casing for supporting said cup for vertical movement with respect to said casing, an inlet port connected to said chamber and disposed outside of the periphery of said cup, and means for normally holding said cup downwardly and open with respect to said port and with said drainage outlet in sealed relationship to the bottom of said casing, whereby said pressure responsive means effects upward movement of said cup to unseal said drainage outlet and moves the rim of said cup into sealing relation with the top of said casing and with said port.

20. A fluid measuring device comprising a casing formed to provide a chamber therein, a cup within said chamber formed to provide a drainage outlet in the bottom thereof, an air vent connected to said chamber over said cup, a pair of vertically spaced diaphragms mounted within said casing and adjacent the top and bottom respectively of said cup to support said cup for vertical movement and to define an inlet chamber over the top diaphragm and over said cup, a pressure chamber between said diaphragms and a drainage chamber beneath said lower diaphragm and said cup, an inlet port connected to said inlet chamber and disposed outside of the periphery of said cup, and means for normally holding said cup downwardly and open with respect to said port and with said drainage outlet in sealed relationship to the bottom of said casing, the upper diaphragm having a greater exposed area than that of the lower diaphragm whereby pressure in said pressure chamber effects upward movement of said cup to unseal said drainage outlet and moves the rim of said cup into sealing relation with the top of said casing and with said port.

21. A mixture valve for mixing fluids, and adapted to be connected to a tank having a fluid level responsive means supported therein, comprising a body portion formed to provide an inlet chamber for receiving a fluid and a discharge port, an inlet control valve in operative relation with said inlet chamber, an inlet valve actuating means adapted to cooperate with said fluid level responsive means for operation at maximum and minimum fluid levels in said tank, and means connected between said valve and said tank and including a suction chamber and port for receiving a second fluid and mixing it with said inlet fluid.

22. A mixing valve for mixing fluids, and adapted to be connected to a tank having a fluid level responsive means supported therein, comprising a body portion formed to provide an inlet chamber for receiving a fluid and a discharge port, mixing means connected between said chamber and said tank and including a suction chamber and port adapted to receive a second fluid for mixture with said inlet fluid, a two-way control valve in operative relation with said discharge port and said inlet chamber, an inlet valve actuating means adapted to cooperate with said fluid level responsive means for operation at maximum and minimum fluid levels in said tank for operating said control valve to open said discharge port at said maximum fluid level and to admit fluid to said inlet chamber at said minimum fluid level.

23. A mixing valve for mixing fluids, and adapted to be connected to a tank having a float supported therein, comprising a body portion formed to provide an inlet chamber for receiving a fluid, a tank drainage chamber adjacent one side of said inlet chamber and connected thereto by an injector port, and a discharge chamber adjacent the other side of said inlet chamber and connected thereto by a discharge port; an inlet control valve in operative relation with said inlet chamber; an inlet valve actuating means adapted to cooperate with said float for operation at maximum and minimum fluid levels in said tank; and an injector mounted in said injector port and including a suction chamber and port adapted to receive a second fluid for mixture with said inlet fluid.

24. A mixing valve for mixing fluids, and adapted to be connected to a tank having a float supported therein, comprising a body portion formed to provide an inlet chamber for receiving a fluid, a tank drainage chamber adjecent one side of said inlet chamber and connected thereto by an injector port, and a discharge chamber adjacent another side of said inlet chamber and connected thereto by a discharge port; an injector mounted in said injector port and including a suction chamber and port adapted to receive a second fluid for mixture with said inlet fluid; a two-way control valve in operative relation with said discharge port and said inlet chamber; and a valve actuating means adapted to cooperate with said float for operating said valve to open said inlet chamber at the minimum fluid level in said tank and to open said discharge port at the maximum fluid level in said tank.

25. A mixing valve for mixing fluids, and adapted to be connected to a tank having a float supported therein, comprising a body portion formed to provide an inlet chamber for receiving a fluid, a tank drainage chamber adjacent one side of said inlet chamber and connected thereto by an injector port, and a discharge chamber adjacent another side of said inlet chamber and connected thereto by a discharge port; a two-way flow-control valve in said inlet chamber in operative relation to said ports; a valve actuating diaphragm mounted in sealed relation to said body portion to form a sealed chamber and connected to said control valve whereby the diaphragm is operative to reciprocate said inlet valve with respect to said ports; actuating means adapted to cooperate with said float for operation at maximum and minimum fluid levels in said tank, and with said diaphragm to operate said valve for successively opening said discharge port at maximum fluid level and opening said injector port at minimum fluid level; and an injector mounted in said injector port and including a suction port adapted to receive a second fluid for mixture with said inlet fluid.

26. A mixing valve for mixing fluids, and adapted to be connected to the bottom of a tank having a float supported therein, comprising a body portion formed to provide an inlet chamber for receiving a fluid, a valve chamber coaxial therewith, a communicating port between said chambers, a tank drainage chamber adjacent one side of said valve chamber and connected thereto by an injector port, and a discharge chamber adjacent another side of said valve chamber and connected thereto by a discharge port; a two-way control valve of relatively limited area in said valve chamber in operative relation with said discharge port and said communicating port for alternately opening said ports; a valve actuating diaphragm of large area relative to said valve area mounted in sealed relation to said body portion to form a sealed chamber; a stem connecting said two-way valve and said diaphragm whereby the diaphragm is operative to reciprocate said valve; actuating means adapted to cooperate with said float for operation at maximum and minimum fluid levels in said tank, and with said diaphragm to operate said two-way valve; and an injector mounted in said injector port and including a suction chamber and port adapted to receive a second fluid for mixture with said inlet fluid.

27. In a fluid dispensing system comprising a measuring chamber, a reservoir for liquid connected to fill the chamber, a tank, means for discharging the measured contents of the chamber into said tank, a source of liquid vehicle under pressure connected to said tank and discharging means, and cyclic control means operable during a first part of the cycle to supply liquid vehicle under pressure to said discharging means and tank and during a second part of the cycle to fill said chamber.

28. In a fluid dispensing system comprising a measuring chamber, a reservoir for liquid connected to fill the chamber, a tank, means for discharging the measured contents of the chamber into said tank, a source of liquid vehicle under pressure connected to said tank and discharging means, and cyclic control means operable during a first part of the cycle to supply liquid vehicle under pressure to said discharging means and tank and during a second part of the cycle to fill said chamber, a drain from said tank, a valve for opening and closing said drain, means for controlling said valve by said cyclic control means to close the valve during the first part of the cycle and to open it during the second part of the cycle.

29. The structure defined by claim 28 in which said discharging means is controlled by power means which are under the control of said cyclic means.

30. The structure defined by claim 29 in which said discharging means and valve control means include a power means which is under the control of said cyclic means.

References Cited in the file of this patent

UNITED STATES PATENTS

| | | |
|---|---|---|
| 1,373,817 | Humphrey | Apr. 5, 1921 |
| 2,578,994 | Dunaway | Dec. 18, 1951 |